(12) United States Patent
Eisele et al.

(10) Patent No.: US 9,545,726 B2
(45) Date of Patent: Jan. 17, 2017

(54) VALVE FOR A VACUUM HANDLING OR CLAMPING DEVICE, AND VACUUM HANDLING DEVICE

(71) Applicant: J. Schmalz GmbH, Glatten (DE)

(72) Inventors: Thomas Eisele, Alpirsbach-Peterzell (DE); Rainer Hoehn, Dornstetten (DE)

(73) Assignee: J.SCHMALZ GmbH, Glatten (DE)

( * ) Notice: Subject to any disclaimer, the term of this patent is extended or adjusted under 35 U.S.C. 154(b) by 0 days.

(21) Appl. No.: 15/033,979

(22) PCT Filed: Sep. 16, 2014

(86) PCT No.: PCT/EP2014/069736
§ 371 (c)(1),
(2) Date: May 3, 2016

(87) PCT Pub. No.: WO2015/062779
PCT Pub. Date: May 7, 2015

(65) Prior Publication Data
US 2016/0318192 A1   Nov. 3, 2016

(30) Foreign Application Priority Data

Nov. 4, 2013   (DE) .................. 10 2013 222 376

(51) Int. Cl.
*B25J 15/06*       (2006.01)
*B65G 47/91*       (2006.01)

(52) U.S. Cl.
CPC ............ *B25J 15/0625* (2013.01); *B65G 47/91* (2013.01)

(58) Field of Classification Search
CPC ..... B25J 15/0625; H01L 21/6838; B66C 1/02; B25B 11/007; B65G 47/91
(Continued)

(56) References Cited

U.S. PATENT DOCUMENTS 6,173,738 B1   1/2001   Opara et al.
7,540,309 B2 *  6/2009   Perlman ................ B25B 11/007
                                                 141/65
(Continued)

FOREIGN PATENT DOCUMENTS

DE       3906634     9/1990
DE      19814262    10/1999
DE      10216220    11/2003

OTHER PUBLICATIONS

DE3906634 English Language Abstract (1 page).
DR19814262 English Language Abstract (2 pages).

*Primary Examiner* — Stephen Vu
(74) *Attorney, Agent, or Firm* — Ware, Fressola, Maguire & Barber LLP

(57) ABSTRACT

A valve has suction and vacuum supply sides and a valve housing inbetween, a flexible dividing wall delimiting a control space in the valve housing connected to the vacuum supply side via a vacuum passage, and a valve body arranged on the dividing wall moving between open/closed positions. The valve body has a sealing portion sealing off or opening up the vacuum passage in closed/open positions. Based on a control space vacuum, the volume of the control space reduces with a deformation of the dividing wall, and the valve body moves from the open to closed position. The valve body has a suction-side passage connecting the suction side to the control space so air is suctioned from the suction side into the control space, and penetrates the dividing wall with the sealing portion on one side and a guide portion on the other side of the dividing wall.

19 Claims, 1 Drawing Sheet

(58) Field of Classification Search
USPC .............................. 294/183, 64.2, 186–189
See application file for complete search history.

(56) References Cited

U.S. PATENT DOCUMENTS

| | | | |
|---|---|---|---|
| 8,201,589 B2 * | 6/2012 | Perlman ................ | B25B 11/007 141/65 |
| 2003/0188790 A1 | 10/2003 | Schmalz et al. | |
| 2011/0001024 A1 * | 1/2011 | Cho ...................... | B25B 11/007 248/205.9 |
| 2012/0256433 A1 * | 10/2012 | Fukano ................ | B25B 11/007 294/183 |

* cited by examiner

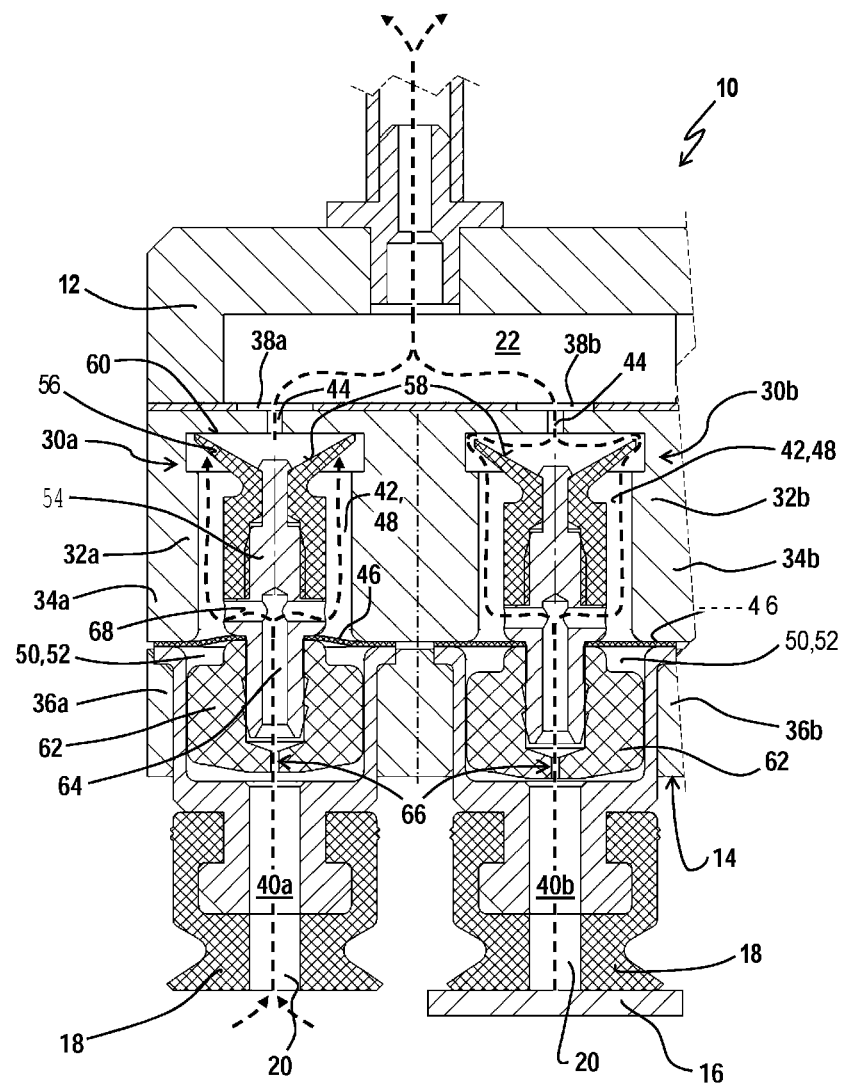

VALVE FOR A VACUUM HANDLING OR CLAMPING DEVICE, AND VACUUM HANDLING DEVICE

BACKGROUND OF THE INVENTION

1. Field of Invention

The invention relates to a valve for vacuum handling devices or vacuum clamping devices, having a valve housing which has a suction side and a vacuum supply side for connection to a vacuum supply device, a flexible dividing wall which delimits a control space in the valve housing, which control space is connected to the vacuum supply side via a vacuum passage, and a valve body which is arranged on the flexible dividing wall and can be moved between an open position and a closed position, wherein the valve body has a sealing portion which seals off the vacuum passage in the closed position and which opens up the vacuum passage in the open position, and wherein, based on a vacuum that develops in the control space, the volume of the control space is reduced with a deformation of the flexible dividing wall, and the valve body is moved from the open position into the closed position, so that when suction is freely applied while the suction side is unoccupied, the valve body can be moved to the closed position as a result of a vacuum that develops in the control space, wherein the valve body has a suction-side passage for connecting the suction side to the control space in terms of flow. This type of valve closes automatically when a suction point is unoccupied, thereby preventing undesirable leakage from the suction side of the valve to the vacuum supply side.

2. Description of Related Art

Various solutions for preventing undesirable leakage when the suction point is unoccupied are known. For example, DE 34 29 444 A1 discloses a flow valve in which a valve element embodied as a ball is displaceably situated in a flow channel. When suction is freely applied through the unoccupied suction point, the strong flow impulse carries the ball along in the flow channel and up to a valve seat, thereby sealing the flow channel. Because they are activated by flow impulse, valves of this type are prone to malfunction as a result of flow bursts. Even when the suction point is occupied, the valve may close unintentionally at the start of a suctioning process as a result of the initial flow burst.

Also known are valves that close automatically when the suction side is unoccupied not as a result of a flow impulse, but as a result of a static pressure difference that develops under free suction. DE 198 14 262 C2 discloses a valve having a valve housing which has a suction side and a vacuum supply side for connection to a vacuum supply device, a flexible dividing wall which delimits a control space in the valve housing, which control space is connected to the vacuum supply side via a vacuum passage, and a valve body which is arranged on the flexible dividing wall and can be moved between an open position and a closed position, wherein the valve body has a sealing portion which seals off the vacuum passage in the closed position and which opens up the vacuum passage in the open position, and wherein, based on a vacuum that develops in the control space, the volume of the control space is reduced with a deformation of the flexible dividing wall, and the valve body is moved from the open position into the closed position, so that when suction is freely applied while the suction side is unoccupied, the valve body can be moved to the closed position as a result of a vacuum that develops in the control space, wherein the valve body has a suction-side passage for connecting the suction side to the control space in terms of flow. The control space, which is delimited by a flexible portion of the valve body, is in constant connection with the vacuum supply side. When the control space is compressed, the flexible portion is deformed, moving the valve body to its closed position. The control space is completely sealed off from the suction side in terms of flow. When suction is applied while the suction side is occupied, a vacuum will not develop on the suction side. This causes the control space to become compressed as a result of the static pressure difference between control space and suction side, thereby moving the valve body into its closed position. This valve has the advantage over valves that function by means of flow impulse that malfunctions resulting from flow bursts can be prevented. However, the time scale for automatic closure and the sensitivity to pressure fluctuations must be adjusted for the specific vacuum handling device or vacuum clamping device that is controlled by the valve.

DE 102 16 220 A1 discloses a vacuum pressure valve having a valve housing with a suction side and a vacuum supply side for connection to a vacuum supply device, a flexible dividing wall which delimits a control space in the valve housing, which control space is connected to the vacuum supply side via a vacuum passage, and a valve body which is arranged on the flexible dividing wall and can be moved between an open position and a closed position, wherein the valve body has a sealing portion which seals off the vacuum passage in the closed position and which opens up the vacuum passage in the open position, and wherein, based on a vacuum that develops in the control space, the volume of the control space is reduced with a deformation of the flexible dividing wall, and the valve body is moved from the open position into the closed position, so that when suction is freely applied while the suction side is unoccupied, the valve body can be moved to the closed position as a result of a vacuum that develops in the control space, wherein the valve body has a suction-side passage for connecting the suction side to the control space in terms of flow, in which the valve body is formed by a disk-like element.

SUMMARY OF THE INVENTION

In light of the above background, it is the object of the invention to prevent undesirable leakage between vacuum supply side and suction side while the suction side is unoccupied, thereby preventing undesirable sensitivity to flow bursts, and to enable adjustment to the characteristics of the vacuum handling device or vacuum clamping device being controlled.

This object is attained by a valve according to the present invention, and by a suction gripping device according to the present invention. These are based on automatically closing valves, in which the closed position is brought about not by a flow impulse but by a static pressure difference between different regions of the valve that develops when the suction side is unoccupied. The valve has a suction side which has at least one suction opening, and a vacuum supply side which has a suction connection for connection to a vacuum supply device. Between vacuum supply side and suction side, a valve housing is provided. In the valve housing, a flexible dividing wall, for example a membrane, is provided, which separates a control space from the suction side. The control space is flow connected to the vacuum supply side via a vacuum passage. A valve body which is capable of moving between an open position and a closed position is arranged on the flexible dividing wall. This valve body has a sealing portion which can be placed against an assigned seat in order to seal the vacuum supply side off from the suction side. The sealing portion is particularly embodied such that, when the valve body is in the closed position, the control space is sealed off from the vacuum supply side. Specifically, the sealing portion is arranged such that in the closed position it seals the vacuum passage, and in the open position it opens up the vacuum passage. The valve is also embodied such that, based on a pressure difference between control space and suction side, more particularly based on a vacuum that develops in the control space relative to the suction side, the volume of the control space can be reduced by a deformation of the flexible dividing wall, thereby causing the valve body to move from the open position to the closed position. In this manner, suction applied freely while the suction side is unoccupied will cause the valve body to move into the closed position as a result of a static vacuum that develops in the control space relative to the suction side.

The valve body has a suction-side passage which, when the valve is in the open position, connects the suction side in terms of flow to the control space that is delimited by the dividing wall in such a way that air can be suctioned into the control space from the suction side. A compact embodiment that offers high functional reliability is achieved in that the valve body penetrates the flexible dividing wall, with the sealing portion being situated on one side of the dividing wall and a guide portion of the valve body being situated on the other side of the dividing wall.

When the valve plunger is in the open position, the vacuum pressure provided by the vacuum supply is constantly acting in the control space, causing the control space to become compressed. Air that is suctioned from the suction side into the control space flows through the suction-side passage, and this flow through the suction-side passage is limited. If the suction side is unoccupied (free suction), the relatively strong flow will lead, as a result of flow resistance, to a pressure difference and thus to a vacuum in the control space relative to the suction side. Once this pressure difference reaches a preset or presettable value, the control space will be compressed, causing the dividing wall to become deformed, thereby moving the valve plunger to its closed position. When this occurs, the sealing portion comes to rest on an assigned seat in the valve housing such that the vacuum passage is sealed. The vacuum prevailing in the vacuum passage, which is connected to the vacuum supply side, keeps the sealing portion of the valve plunger held in the closed position. The valve remains closed and the valve body is held securely in its closed position by suction.

Thus when the suction side is unoccupied, the valve body is moved to its closed position by a static pressure difference that develops between control space and suction side, rather than by the flow impulse directly. The valve according to the invention can be adjusted to the flow characteristics of the vacuum supply or of the device to be controlled by adjusting the embodiment of the flexible dividing wall, particularly the flexibility thereof, by adjusting the configuration of the suction-side passage and/or by adjusting the configuration of the vacuum passage. In particular, the responsiveness of the valve can be defined.

The suction side and the vacuum supply side can comprise connection elements, for example, a suction connection element on the suction side for connection to a vacuum handling or vacuum clamping device, e.g. a suction gripper, and a supply connection element on the vacuum supply side for connection to a vacuum supply device.

For adjusting flow resistance and therefore the vacuum that develops between suction side and control space as a result of the suction flow through the suction side, the suction-side passage preferably has a throttle point. This is embodied particularly as adjustable, so that the flow resistance can be defined and varied. For this purpose, a throttle control element can be provided, which can be moved between a throttling position, which corresponds to a high flow resistance, and an open position, which corresponds to a comparatively low flow resistance. This can be achieved, for example, by means of a worm screw that can be screwed into a throttle channel. The adjustability of flow resistance allows the valve sensitivity to be defined. The flow resistance of the throttle point is preferably greater than the flow resistance for a flow of suction from the control space through the vacuum passage. The flow cross-section of the suction-side passage at the throttle point is preferably smaller than the smallest flow cross-section of the vacuum passage at its narrowest point.

The suction-side passage can extend in the form of a channel through the guide portion and can open into connecting openings which are provided between the flexible dividing wall and the sealing portion of the valve body, and which connect the control space to the suction-side passage and the suction side. The throttle point can advantageously be arranged in the channel-like portion of the valve plunger.

The sealing portion preferably delimits a conical or suction cup-like depression, particularly having a sealing lip that extends around the circumference of the depression. The depression faces the vacuum side portal. In the closed position, the depression defines a suction attachment space, which is connected to the vacuum supply side but is sealed off from the control space. In the closed position, the suction attachment space is evacuated and the valve plunger is held securely in its closed position by suction. The depression is particularly delimited by deformable walls of the sealing portion such that when it is held securely by suction, suction attachment space is compressed and flattened, and the sealing portion rests against a seat.

The flexible dividing wall is preferably secured along a circumferential edge in the valve housing. More particularly, the valve housing is embodied as a multi-part housing, and the dividing wall is attached by being clamped along its edge between the parts of the valve housing that can be joined. The dividing wall serves particularly as a support membrane for the valve body. The valve body is preferably supported at the center of the flexible dividing wall, spaced from the circumferential edge of the flexible dividing wall.

The tension and/or elasticity of the dividing wall enables a prestressing force to be defined for the valve body in its open position against its movement to the closed position. In this manner, the responsiveness of the self-closing valve, more particularly, a pressure difference beyond which the valve body will move to its closed position, can be adjusted. It is also conceivable for an adjustment device to be provided, with which the tension of the flexible dividing wall can be adjusted. It is also conceivable for electroactive polymers to be used in the flexible dividing wall or for electrorheological fluids to be placed in spaces the flexible dividing wall, to allow the rigidity and flexibility of the flexible dividing wall to be adjusted by applying an electric voltage.

The flexible dividing wall preferably extends such that, on the side of the flexible dividing wall that faces away from the control space, a lateral suction space is formed. This space is particularly connected in terms of pressure to a suction opening on the suction side or opens into such a suction opening. The lateral suction space is thereby pressurized by the pressure prevailing on the suction intake side. Thus the flexible dividing wall is pressurized on one side by the vacuum that develops in the control space, and on the other side by the pressure of the suction side. The dividing wall is therefore deformed based on the static pressure difference that develops on the two sides of the dividing wall as a result of the flow from the suction side into the control space.

The valve body can be embodied as integral with the flexible dividing wall. The valve housing is particularly embodied as a multipart housing, comprising a base part and a closure part. The base part is connected to the closure part, preferably clamping the flexible dividing wall between base part and closure part. The control space then particularly extends into the base part. These embodiments simplify the production and assembly of the valve.

In a further embodiment, the vacuum passage can have a vacuum throttle point, which defines a flow resistance for the flow of suction from the control space through the vacuum passage to the vacuum supply side. The vacuum throttle point can also be embodied such that flow resistance can be adjusted in the same manner as described above in connection with the suction-side passage.

The object stated in the introductory part is also attained by a suction gripping device according to the present invention, which has a suction element having a suction space for placement on a workpiece to be gripped, the suction space being connected to the suction side of a valve of the type described above. Here, the suction element is preferably connected to the flexible dividing wall and/or to the valve body, so that when the valve body moves from the open position to the closed position, the suction element is moved from a suction position, in which it is advanced, to a retracted, passive position. In particular, the suction element is connected to the above-described guide portion of the valve body, which lies on the side of the flexible dividing wall that faces away from the suction space.

The suction gripping device preferably has a device housing, which comprises or forms the valve housing. The suction element can be arranged within the device housing in such a way that, in its advanced suction position, it projects beyond the valve housing and can be placed onto a workpiece. When the valve is switched into the closed position, the suction element is retracted into its passive position. This is advantageous particularly when the suction gripping device comprises a plurality of suction elements arranged side by side, as is the case, for example, with large-area vacuum grippers. In this manner, when suction elements that are situated at the edges of the workpiece to be gripped do not form a completely tight seal, and thus leakage through the respective suction side remains, these suction elements will not push the gripped workpiece away from the suction gripping device against the suctioning effect of the remaining suction elements. In the described embodiment, such unoccupied suction elements are retracted by with the movement of the valve body into its closed position.

BRIEF DESCRIPTION OF THE DRAWING

Additional details and embodiments of the invention are described and discussed in greater detail in the following, with reference to FIG. 1.

DETAILED DESCRIPTION OF THE BEST MODE OF THE INVENTION

FIG. 1 shows a sectional illustration of a portion of a suction gripping device 10. Suction gripping device 10 has a device housing 12 having a contact surface 14, which faces a workpiece 16 to be gripped when suction gripping device 10 is in use. A plurality of suction elements 18 are arranged side by side on contact surface 14. Each suction element 18 delimits a suction space 20 which is open in the suction direction, and which rests against a workpiece 16 forming a tight seal for suctioning said workpiece. Each suction element 18 is assigned a valve for controlling the vacuum supply to the respective suction space 20. The illustration of FIG. 1 shows two valves 30a, 30b arranged side by side. Valves 30a, 30b are held within device housing 12. As such, each section of device housing 12 forms an assigned valve housing 32a, 32b for one valve 30a, 30b (the letters added to the reference signs in each case indicate the assignment to valve 30a or 30b).

Device housing 12 is configured as a multipart housing, and therefore valve housings 32a, 32b are also configured as multipart housings. Each valve housing 32a, 32b therefore comprises a base part 34a (or 34b), formed by a first device housing part, and a closure part 36a, 36b, connected thereto and formed by a second device housing part located at the bottom.

A vacuum supply channel 22, which communicates with a vacuum supply device (not shown), and by means of which air or some other fluid can be evacuated from the vacuum supply channel 22, extends in an upper portion of device housing 12. Vacuum supply channel 22 supplies vacuum pressure to a vacuum side connection of a vacuum supply side 38a, 38b of each of the valves 30a, 30b.

The portion of device housing 12 that forms the respective valve housing 32a, 32b extends between the respective vacuum supply side 38a, 38b and a suction side 40a, 40b of valve 30a, 30b, which has a suction opening. Suction side 40a, 40b communicates with the respective suction space 20. Valve housing 32a, 32b thus extends between suction side 40a, 40b and vacuum supply side 38a, 38b. Of course it is also conceivable for each valve 30a, 30b to have a separately embodied valve housing 32, which is connected via a vacuum supply side, for example, to a vacuum supply channel and a vacuum supply device, and which can be connected via a suction side to the suction space of a suction gripping device.

A cylindrical valve housing recess 42, for example, is formed in base part 34a, 34b of valve housing 32a, 32b, and extends in the direction away from contact surface 14 up to vacuum supply channel 22. Valve housing recess 42 is flow connected via a vacuum passage 44 to vacuum supply side 38a, 38b. A throttle point, not shown in greater detail, for defining a flow resistance may be provided in vacuum passage 44.

Between closure part 36a, 36b, situated at the bottom, and base part 34a, 34b, situated thereabove, a flexible dividing wall 46, embodied as a flexible membrane, is clamped. Flexible dividing wall 46 delimits a control space 48 in valve housing recess 42, said control space being connected via vacuum passage 44 to vacuum supply side 38a, 38b.

Closure part 36a, 36b has a housing opening 50, arranged substantially coaxially to valve housing recess 42. A lateral suction space 52 is thereby formed on the side of flexible dividing wall 46 that faces away from control space 48. As will be described in greater detail below, this space is pressure connected to suction side 40a, 40b and therefore to suction space 20. As such, flexible dividing wall 46 is pressurized on one side by the pressure prevailing in control space 48 and on the other side by the pressure prevailing in lateral suction space 52.

A valve body 54 having a sealing portion 56 that extends from dividing wall 46 toward vacuum supply side 38a, 38 and is made of a flexibly deformable material is arranged on flexible dividing wall 46. Sealing portion 56 has a conical or suction cup-like depression 58, which is open toward vacuum passage 44. Said depression is encircled by sealing portion 56 in the manner of a sealing lip. Valve body 14 is displaceable axially in valve housing recess 42 between an open position (shown by way of example in valve 30b), and a closed position (shown by way of example in valve 30a). In the closed position, the region of sealing portion 56 that encircles depression 58 in the manner of a sealing lip rests against a seat 60, which in the example shown is formed by the wall of valve housing 32a, 32b that has vacuum passage 44. In this closed position, sealing portion 56 seals vacuum supply side 38a, 38b off from control space 48. In the open position (cf. valve 30b), a flow connection exists from vacuum supply channel 22 through vacuum passage 44 into control space 48.

Valve body 54 penetrates flexible dividing wall 46 and forms a guide portion 62 on the side of the dividing wall that projects into lateral suction space 52. Guide portion 62 is guided within housing opening 50 with a certain amount of play, so that the pressure prevailing on suction side 40a, 40b is present in the lateral suction space 52 that borders dividing wall 46.

A suction-side passage 64 projects through valve body 54, extending channel-like in the form of a longitudinal central bore within guide portion 62. Suction-side passage 54 connects control space 48 to lateral suction space 52 and therefore to suction side 40a, 40b.

Along suction-side passage 64, a throttle point 66 is provided, by means of which a flow resistance for the flow of suction from lateral suction space 52 or suction side 40a, 40b through suction-side passage 64 into control space 48 can be defined. In the example shown, throttle point 66 is embodied as a through channel in a guide portion 62, which is embodied as a snap-on part for valve body 54. Thus the flow resistance of throttle point 66 can be adjusted by replacing the snap-on part.

Suction-side passage 64, which is embodied in the form of a channel, extends from guide portion 62 in valve body 54 through flexible dividing wall 46 toward vacuum supply side 38a, 38b, and opens in connecting openings 68 of valve body 54 into control space 48. Connecting openings 68 are preferably arranged between sealing portion 56 and flexible dividing wall 46, and are embodied, for example, as radially extending openings to suction-side passage 64.

The membrane-like, flexible dividing wall 46 in the example shown is preferably arranged its prestressed state in valve housing 32a, 32b. Valve body 54 is thereby prestressed against displacement from the open position shown in valve 30b.

When suction is applied with the suction side unoccupied, as is shown for valve 30a on suction side 40a, first a flow develops from suction space 20 through suction side 40a, through suction-side passage 64 into control space 48, and from there through vacuum passage 44 to vacuum supply channel 22. However, since the flow is limited by throttle point 66, when suction side 40a is unoccupied, significant vacuum pressure cannot build up in suction space 20 and thus in lateral suction space 52. The control space is evacuated via vacuum passage 44. Vacuum pressure therefore develops in control space 48 in relation to lateral suction space 52 or suction side 40a as a result of the flow resistance defined by throttle point 66. This causes a deflection of flexible dividing wall 46, decreasing the volume of control space 48 (cf. the illustration of valve 30a). Valve body 54 is thereby moved from its open position toward its closed position. Sealing portion 56 also thereby comes into contact with seat 60 and covers vacuum passage 44. As a result, control space 48 is sealed off from vacuum supply side 38a, and the vacuum supply continues to supply suction only in the partial space defined by depression 58. Valve body 54 is held securely in its closed position by suction. In control space 48, the pressure prevailing in lateral suction space 52 then develops on suction side 40a by way of a pressure compensation via throttle point 66. When suction is freely applied through an unoccupied suction side 40a, valve 30a therefore switches automatically to its closed position.

If suction space 20 of suction element 18 is sealed off by a workpiece 16 (as shown for valve 30b), there will be no significant flow through throttle point 66, and therefore no sufficient pressure difference will develop between control space 48 and lateral suction space 52. Flexible dividing wall 46 thus will not be deflected, and valve body 54 will remain in its open position, as shown with valve 30b.

The Scope of the Invention

It should be understood that, unless stated otherwise herein, any of the features, characteristics, alternatives or modifications described regarding a particular embodiment herein may also be applied, used, or incorporated with any other embodiment described herein. Also, the drawings herein are not drawn to scale.

Although the invention has been described and illustrated with respect to exemplary embodiments thereof, the foregoing and various other additions and omissions may be made therein and thereto without departing from the spirit and scope of the present invention.

The invention claimed is:
1. A valve (30a, 30b) for a vacuum handling or vacuum clamping device (10), comprising
   a valve housing (32a, 32b) which has a suction side (40a, 40b) and a vacuum supply side (38a, 38b) for connection to a vacuum supply device,
   a flexible dividing wall (46) which delimits a control space (48) in the valve housing (32a, 32b), which control space (48) is connected to the vacuum supply side (38a, 38b) via a vacuum passage (44), and
   a valve body (54) which is arranged on the flexible dividing wall (46) and can be moved between an open position and a closed position,
   wherein, based on a vacuum that develops in the control space (48), the volume of the control space (48) is reduced with a deformation of the flexible dividing wall (46), and the valve body (54) is moved from the open position into the closed position, so that when suction is freely applied while the suction side (40a, 40b) is unoccupied, the valve body (54) can be moved to the closed position as a result of a vacuum that develops in the control space (48), wherein the valve body (54) has a suction-side passage (64) for connecting the suction side (40a, 40b) to the control space (48) in terms of flow, characterized in that
   the valve body (54) has a sealing portion (56) which seals off the vacuum passage (44) in the closed position and which opens up the vacuum passage (44) in the open position, with the sealing portion (56) being situated such that it rests against an assigned seat (60) in the valve housing (32a,32b) in order to seal of the vacuum passage (44); and wherein the suction-side passage (64) has a throttle point (66) that defines a flow resistance for the flow of suction from the suction side (40a, 40b) into the control space (48) such that, when air is suctioned in, a vacuum forms between the suction side (40*a*, 40*b*) and control space (48).

2. The valve (30*a*, 30*b*) according to claim 1, characterized in that the suction-side passage (64) extends within the guide portion (62) in the form of a channel, and the valve body (54) has connecting openings (68) between the flexible dividing wall (46) and the sealing portion (56), in which openings the suction-side passage (64) opens into the control space (48).

3. The valve (30*a*, 30*b*) according to claim 1, characterized in that the sealing portion (56) has a conical or suction cup-like depression (58), which is delimited by deformable walls and which faces the vacuum passage (44).

4. The valve (30*a*, 30*b*) according to claim 1, characterized in that the flexible dividing wall (46) is secured along a circumferential edge in the valve housing (32*a*, 32*b*).

5. The valve (30*a*, 30*b*) according to claim 1, characterized in that the flexible dividing wall (46) is clamped in such a way that the valve body (54) is prestressed in the open position against movement into the closed position.

6. The valve (30*a*, 30*b*) according to claim 1, characterized in that, on the side of the flexible dividing wall (46) that faces away from the control space (48), a lateral suction space (52) is formed, which is pressure connected to the suction side (40*a*, 40*b*), including leading to a suction opening on the suction side (40*a*, 40*b*).

7. The valve (30*a*, 30*b*) according to claim 1, characterized in that the valve housing (32*a*, 32*b*) is configured as a multipart housing having a base part (34*a*, 34*b*) and a closure part (36*a*, 36*b*) connected thereto, wherein the flexible dividing wall (46) is clamped between the base part (34*a*, 34*b*) and the closure part (36*a*, 36*b*) in such a way that the control space (48) extends within the base part (34*a*, 34*b*) and is delimited at the connection to the closure part (36*a*, 36*b*) by the flexible dividing wall (46).

8. A suction gripping device (10) having a suction element (18), which has a suction space (20) for placement on a workpiece to be gripped, and having a valve (30*a*, 30*b*) according to claim 1, wherein the suction space (20) is connected to the suction side (40*a*, 40*b*) of the valve (30*a*, 30*b*).

9. The suction gripping device according to claim 8, characterized in that the suction element (18) is connected to the flexible dividing wall (46) in such a way that, when the valve body (54) is moved from the open position to the closed position, the suction element (18) is moved from an advanced suction position to a retracted passive position.

10. The valve (30*a*, 30*b*) according to claim 1, characterized in that the sealing portion (56) extends from the flexible dividing wall (46) toward the vacuum supply side (38*a*, 38).

11. The valve (30*a*, 30*b*) according to claim 10, characterized in that the valve body (54) penetrates the flexible dividing wall (46), with the sealing portion (56) being situated on one side of the dividing wall (46) and a guide portion (62) being situated on the other side of the dividing wall.

12. The valve (30*a*, 30*b*) according to claim 11, characterized in that the suction-side passage (64) extends within the guide portion (62) in the form of a channel, and the valve body (54) has connecting openings (68) between the flexible dividing wall (46) and the sealing portion (56), in which openings the suction-side passage (64) opens into the control space (48).

13. The valve (30*a*, 30*b*) according to claim 11, characterized in that the suction-side passage (64) has a throttle point (66) that defines a flow resistance for the flow of suction from the suction side (40*a*, 40*b*) into the control space (48) such that, when air is suctioned in, a vacuum forms between the suction side (40*a*, 40*b*) and control space (48).

14. The valve (30*a*, 30*b*) according to claim 10, characterized in that the suction-side passage (64) extends within the guide portion (62) in the form of a channel, and the valve body (54) has connecting openings (68) between the flexible dividing wall (46) and the sealing portion (56), in which openings the suction-side passage (64) opens into the control space (48).

15. The valve (30*a*, 30*b*) according to claim 10, characterized in that the suction-side passage (64) has a throttle point (66) that defines a flow resistance for the flow of suction from the suction side (40*a*, 40*b*) into the control space (48) such that, when air is suctioned in, a vacuum forms between the suction side (40*a*, 40*b*) and control space (48).

16. The valve (30*a*, 30*b*) according to claim 1, characterized in that the valve body (54) penetrates the flexible dividing wall (46), with the sealing portion (56) being situated on one side of the dividing wall (46) and a guide portion (62) being situated on the other side of the dividing wall.

17. The valve (30*a*, 30*b*) according to claim 16, characterized in that the suction-side passage (64) extends within the guide portion (62) in the form of a channel, and the valve body (54) has connecting openings (68) between the flexible dividing wall (46) and the sealing portion (56), in which openings the suction-side passage (64) opens into the control space (48).

18. The valve (30*a*, 30*b*) according to claim 17, characterized in that the suction-side passage (64) has a throttle point (66) that defines a flow resistance for the flow of suction from the suction side (40*a*, 40*b*) into the control space (48) such that, when air is suctioned in, a vacuum forms between the suction side (40*a*, 40*b*) and control space (48).

19. The valve (30*a*, 30*b*) according to claim 16, characterized in that the suction-side passage (64) has a throttle point (66) that defines a flow resistance for the flow of suction from the suction side (40*a*, 40*b*) into the control space (48) such that, when air is suctioned in, a vacuum forms between the suction side (40*a*, 40*b*) and control space (48).

* * * * *